United States Patent
Tanaka et al.

[19]

[11] Patent Number: 5,945,759
[45] Date of Patent: Aug. 31, 1999

[54] STEPPING MOTOR

[75] Inventors: Naoto Tanaka; Atsunori Matsuda, both of Miyota-machi, Japan

[73] Assignee: Minebea Co., Ltd., Miyota-machi, Japan

[21] Appl. No.: 09/236,472

[22] Filed: Jan. 25, 1999

[30] Foreign Application Priority Data

May 12, 1998 [JP] Japan ................................. 10-128504
Jul. 9, 1998 [JP] Japan ................................. 10-210346

[51] Int. Cl.$^6$ ....................................................... H02K 5/16
[52] U.S. Cl. ............................ 310/90; 310/89; 310/49 R; 310/259
[58] Field of Search ................................. 310/90, 49 R, 310/89, 259, 42; 384/537, 493

[56] References Cited

U.S. PATENT DOCUMENTS 4,528,473  7/1985  Tezuka ..................................... 310/256
5,166,565  11/1992  Katsuzawa et al. ...................... 310/90
5,723,926  3/1998  Obara et al. ............................. 310/89

FOREIGN PATENT DOCUMENTS

A-8-298739  11/1996  Japan.

*Primary Examiner*—Nestor Ramirez
*Assistant Examiner*—Saeed Ghahramani
*Attorney, Agent, or Firm*—Oliff & Berridge, PLC

[57] ABSTRACT

To facilitate manufacture of casings of a stepping motor and simultaneously to enhance the performance thereof, a rotor (5) is mounted on a rotary shaft (1), the rotor (5) is supported to the casings (6) and (7) by pressing a metal plate, a bush (13) made of non-magnetic material is retained to at least one of the casings (6) and (7), and an inner circumferential portion of a stator core (10) provided between the casings (6) and (7) is supported by the bush (13). Since a gap between the outer circumferential portion of the rotor (5) and the inner circumferential portion of the stator core (10) may be kept constant by the bush (13), a performance of rotation is enhanced, and since the bush is made of non-magnetic material, magnetism generated in the stator core (10) does not leak to the casings (6) and (7).

14 Claims, 8 Drawing Sheets

STEPPING MOTOR

BACKGROUND OF THE INVENTION

1. Field of Invention

The present invention relates to a stepping motor used in an OA machine for processing image information such as a facsimile, an ink jet printer, a laser beam printer, a copying machine or the like.

2. Background of Related Art

In a stepping motor used in such as the above OA machine, there has been demanded that a resolving power and a noiseless property should be enhanced to attain a low vibration and a low noise while aiming at reducing cost therefor that is an absolute condition.

Figure 13:
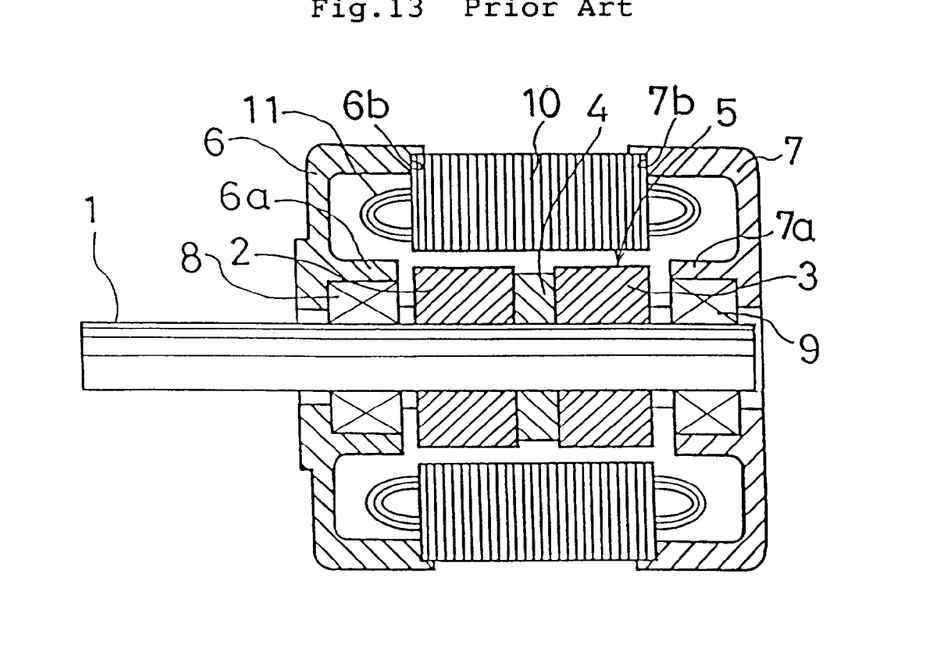
FIG. 13 is a longitudinal sectional view showing a example of a conventional stepping motor.

The conventional technology disclosed in Japanese Patent Application Laid-Open No. Hei 8-298739 will be described with reference to FIG. 13. A rotor 5 composed of a pair of disc-like rotor cores 2 and 3 and a magnet 4 interposed therebetween is mounted on a rotary shaft 1. The rotary shaft 1 is supported by bearings 8 and 9 which are fixed by projected portions 6a and 7a of aluminum-made front casing 6 and rear casing 7, respectively. Stepped portions 6b and 7b are formed at confronting portions of the front and rear casings 6 and 7. An outer circumferential portion of a stator core 10 is supported by the stepped portions 6b and 7b. A stator coil 11 is wound around the stator core 10 and is connected to a drive circuit (not shown).

In this stepping motor, current is intermittently supplied from the drive circuit (not shown) to the stator core 11 to thereby intermittently rotate the rotor 5. The rotational property of this arrangement depends upon uniformity of a fine gap formed between an inner diameter of the stator core 10 and an outer diameter of the rotor 5. In the above-described arrangement, since the outer circumferential portion of the stator core 10 is retained by the casings 6 and 7, an eccentric amount of the outer fitting portions of the casings 6 and 7 in the assembled condition of the stator core 10 to the casings 6 and 7 is added to an eccentric amount of the inner diameter of the stator core 10 before the assembling work. As a result, the fine gap between the inner diameter of the stator core 10 and the outer diameter of the rotor 5 becomes an eccentric gap, sometimes resulting in non-uniformity.

For this reason, the arrangement suffers from a problem that the dimensional precision of the outer diameter to the inner diameter of the stator core 10 and the dimensional precision of the outer circumferential fitting portions of the casings to the dimension of the fitting portions of the bearings 8 and 9 must be high in machining.

Figure 14:
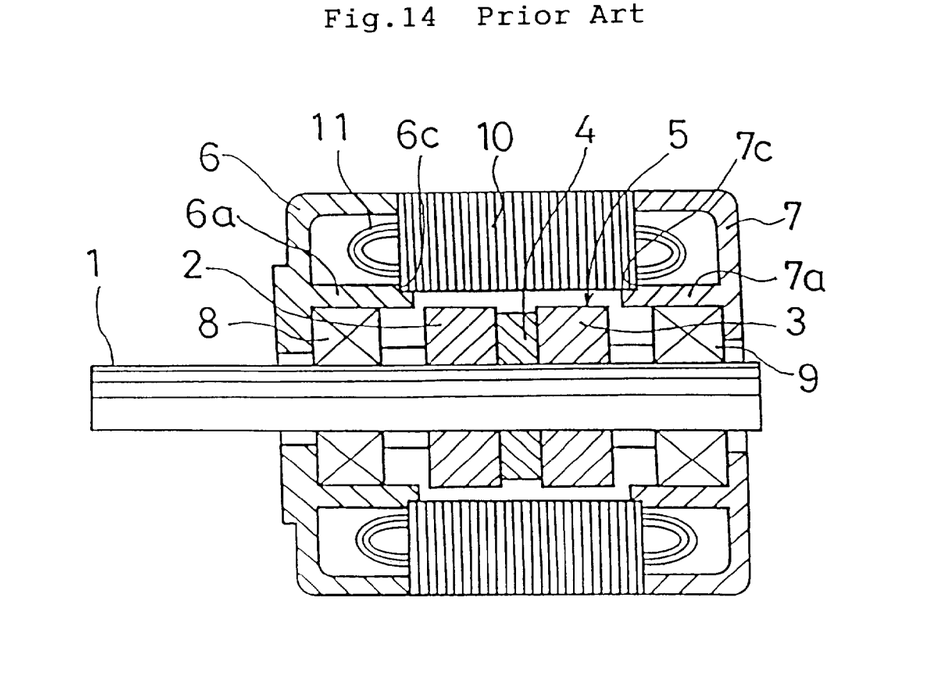
FIG. 14 is a longitudinal sectional view showing another example of a conventional stepping motor.

In order to solve this problem, the arrangement is modified in design in a stepping motor as shown in FIG. 14. In this stepping motor, the stepped portions 6c and 7c are formed on the outer circumferential side of the projected portions 6a and 7a of the front and rear casings 6 and 7. The inner circumferential portion of the stator core 10 is received by the stepped portions 6c and 7c. If such an arrangement is adopted, the inner circumferential portion of the stator core 10 is directly supported. It is therefore possible to remove the eccentric factor to be generated between the inner diameter of the stator core 10 and the outer diameter of the rotor 5. Thus, it is possible to solve the above-noted problem.

Figure 15:
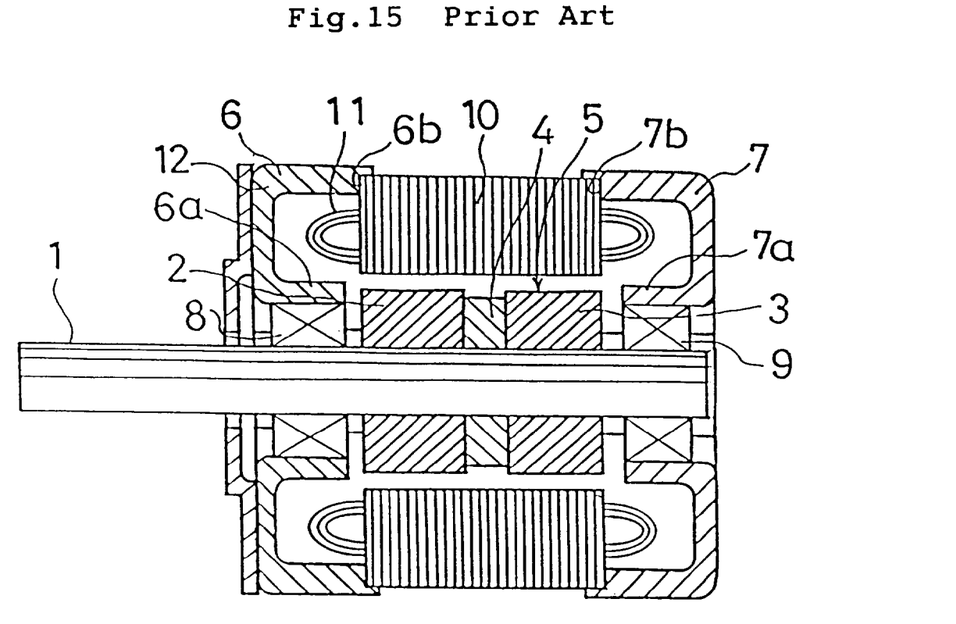
FIG. 15 is a longitudinal sectional view showing another example of a conventional stepping motor.

FIG. 15 shows a design for the purpose of reducing the manufacture cost. The shape of the design is simplified in which, after the front casing 6 has been cast in aluminum, the front casing 6 is machined. The front casing 6 is shaped by metal-plate pressing. With this structure, it is possible to reduce the cost of the casings 6 and 7 per se but the eccentric factor to be generated between the inner diameter of the stator core 10 and the outer diameter of the rotor 5 is the same as that shown in FIG. 13. Incidentally, though the structure shown in FIG. 15 exemplifies the structure in which the plate 12 is arranged in front of the front casing 6, the plate 12 may not be used.

Figure 16:
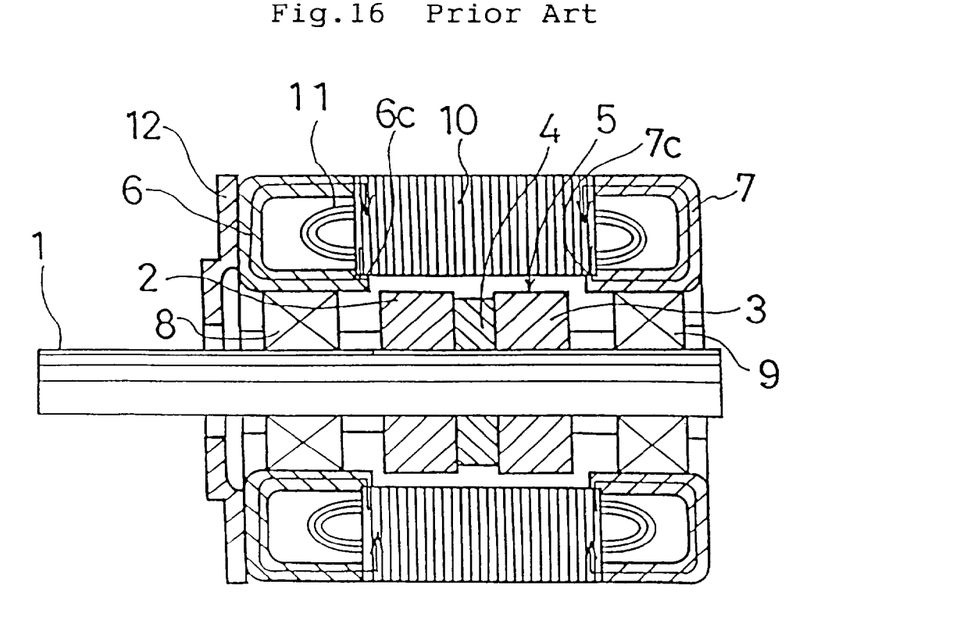
FIG. 16 is a longitudinal sectional view showing still another example of a conventional stepping motor.

FIG. 16 shows a design for the purpose of enhancing the rotational gap precision of the design shown in FIG. 15. Bearing fitting portions of the metal plates are extended and the stepped portions 6c and 7c are formed in the extended portions. The inner circumferential portion of the stator core 10 is received by the stepped portions 6c and 7c. However, this structure suffers from a defect that, as shown by the arrows in FIG. 16, the magnetic field generated in the stator core 10 leaks to the casings 6 and 7 of the metal plates to considerably deteriorate the motor performance. Accordingly, in order to obviate the magnetic leakage in the structure in which the casings 6 and 7 are formed by pressing the metal plate, it is necessary to magnetically shield the inner diameter fitting portions of the stator core 10. It is impossible to take a structure in which the stator core 10 is held in the inner diameter portion.

SUMMARY OF THE INVENTION

In view of the above-noted defects, an object of the present invention is to provide a structure in which the above-noted defects do not occur even in the case where the casings are made by pressing metal plate.

According to a first aspect of the present invention, in a stepping motor having a structure in which a stator core is disposed outside of a rotor mounted on a rotary shaft, and a rear portion and a front portion of the rotary shaft are supported by bearings mounted on casings provided on the front and rear sides of the stator core, respectively, the stepping motor is characterized in that the casings are press-formed with a metal plate, a bush made of non-magnetic material is mounted on at least one of the casings, and the stator core is supported by the bush.

Also, according to a second aspect of the present invention, in the first aspect of the present invention, the bush supports at least one of the bearings.

Also, according to a third aspect of the present invention, in the first or second aspect of the present invention, the bush is made of non-magnetic metallic material, and fixed to at least one of the casings by either adhesives or press-fitting.

Also, according to a fourth aspect of the present invention, in the first or second aspect of the present invention, a plurality of projected pieces directed inwardly for receiving an outer circumference of at least one of the bearings is formed integrally with a portion of at least one of the casings onto which at least one of the bearing is mounted, synthetic resin is filled in between the projected pieces and the stator core circumferentially so that the bush is mounted.

Furthermore, according to a fifth aspect of the present invention, in the first or second aspect of the present invention, the bush which is made of thermoplastic resin is fixed to at least one of the casings.

Then, according a sixth aspect of the present invention, in a stepping motor in which a stator core is disposed outside of a rotor mounted on a rotary shaft, and a rear portion and a front portion of the rotary shaft are supported to bearings mounted on casings provided on the front and rear sides of the stator core, respectively, the stepping motor is characterized in that a bush made of non-magnetic material is mounted on one of the stator cores, and at least one of the casings is mounted on the bush.

Also according to a seventh aspect of the present invention, in the sixth aspect of the present invention, the bush supports at least one of the bearings.

According to an eighth aspect of the present invention, in the sixth or seventh aspect of the present invention, the bush is made of non-magnetic metallic material, and fixed to at least one of the stator cores by either adhesives or press-fitting.

According to a ninth aspect of the present invention, in the sixth or seventh aspect of the present invention, the bush is made of thermoplastic resin and fixed to at least one of the stator cores with thermoplastic resin.

With such an arrangement, since the bush made of non-magnetic metallic material or synthetic resin is bonded with the inner circumferential portion of the stator core, an eccentric factor between the inner circumferential portion of the stator core and the outer circumferential portion of the rotor is removed to thereby enhance the rotational performance of rotation, and in addition to overcome the risk that the magnetism generated in the stator core leaks to the casings made of the metal plate.

DETAILED DESCRIPTION OF PREFERRED EMBODIMENTS

An embodiment of the present invention will now be described with reference to FIG. 1 in which the same reference numerals are used to indicate the like members or components shown in FIGS. 9 to 12. In this embodiment, the front casing 6 is the same as that shown in FIGS. 11 and 12 but a sleeve-like bush 13 made of non-magnetic material is fitted into the rear casing 7. A stepped portion 13a is formed in the outer circumferential portion on the inner side of the bush 13. The inner circumferential portion of the stator core 10 is retained by the stepped portion 13a. Incidentally, the rear bearing 9 is supported by the inner circumference of the bush 13.

The bush 13 is made of aluminum alloy or any other non-magnetic metal or is molded of resin. A recessed groove 13b is formed at portions in the vicinity of the end of the bush 13. The bush 13 is fitted into a hole edge 7d of the casing 7 at the recessed groove 13b. In the case where the bush 13 is made of metal, after the bush 13 has been pressed and fitted, the bush 13 is press-fitted and fixed by applying a force directed inwardly to the outer portion of the bush 13. In the case where the bush 13 is molded of resin, the bush 13 is fixed with adhesive or by welding after being pressed and fitted. Furthermore, in the case of the bush 13 is made of thermoplastic resin, the bush 13 is formed integrally with the casing 7.

Figure 1:
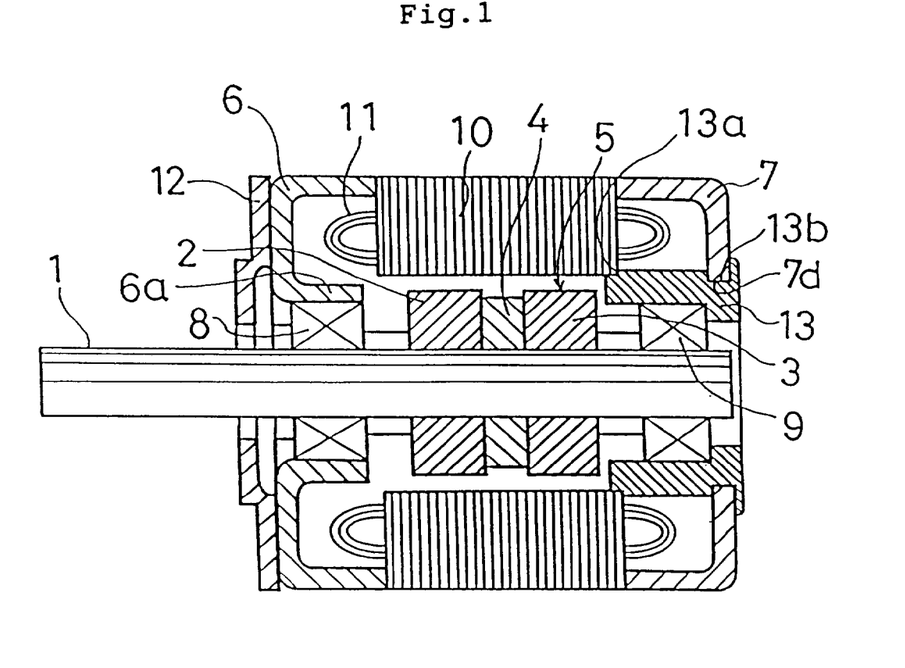
FIG. 1 is a longitudinal sectional view showing one example of an embodiment of the present invention.
Figure 2:
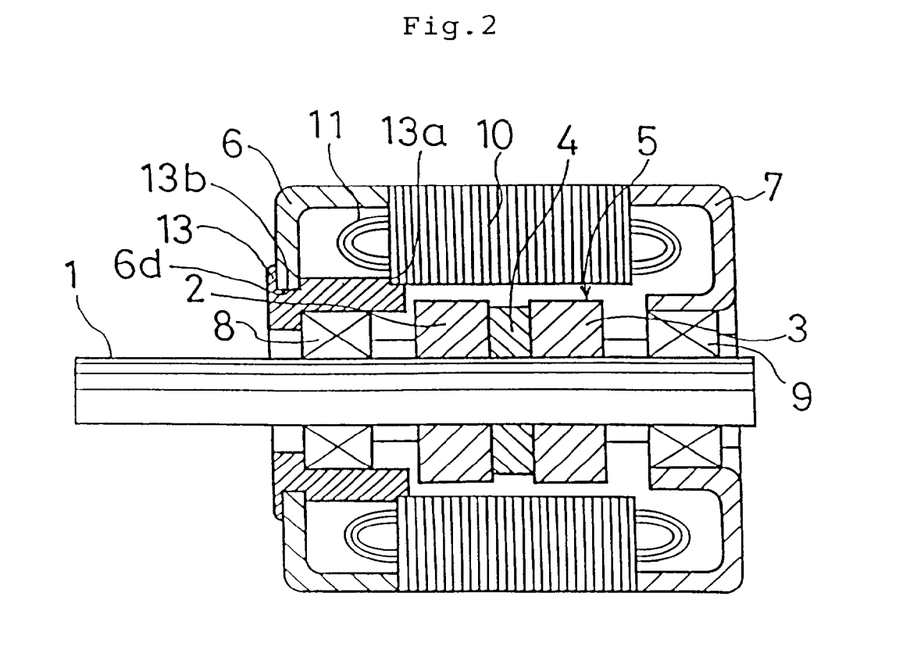
FIG. 2 is a longitudinal sectional view showing another example of an embodiment of the present invention.

FIG. 2 shows an embodiment in which the recessed groove 13b of the bush 13 is fitted in a hole edge 6d of the front casing 6, and the inner circumferential portion of the stator core 10 is supported to the front edge of the bush 13. The fixture structure of the bush 13 that has been fitted and other structures are the same as those of FIG. 1.

Figure 3:
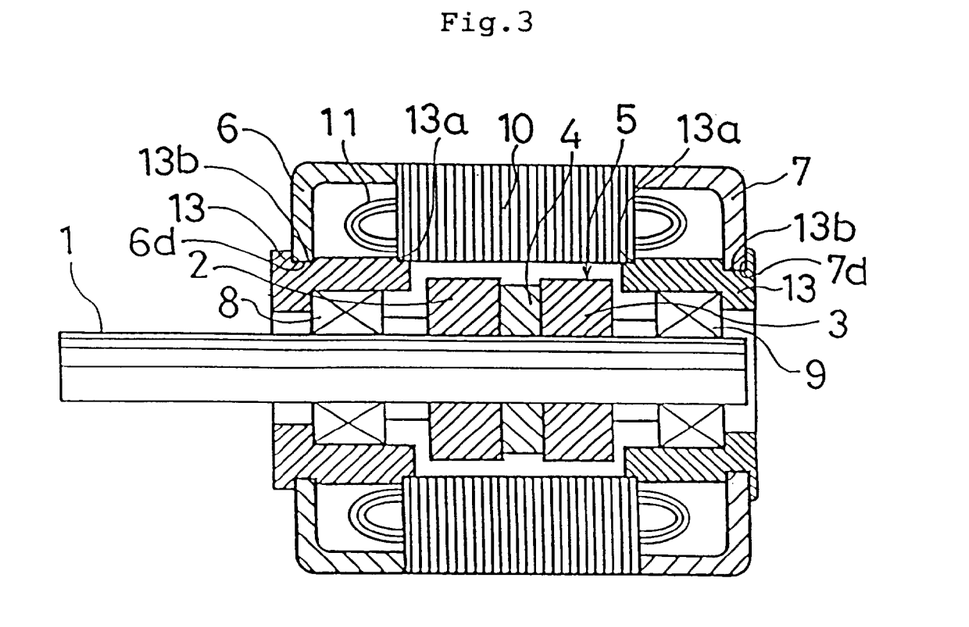
FIG. 3 is a longitudinal sectional view showing still another example of an embodiment of the present invention.

In the foregoing two embodiments, the bush 13 is mounted on either, front casing 6 or rear casing 7. However, the present invention is not limited thereto or thereby. The bushes 13 may be mounted on both the front and rear casings 6 and 7. FIG. 3 shows an embodiment showing the above case. In this embodiment, since the bushes 13 are mounted on the front and rear casings, a cross-sectional shapes of the casings 6 and 7.

Figure 4:
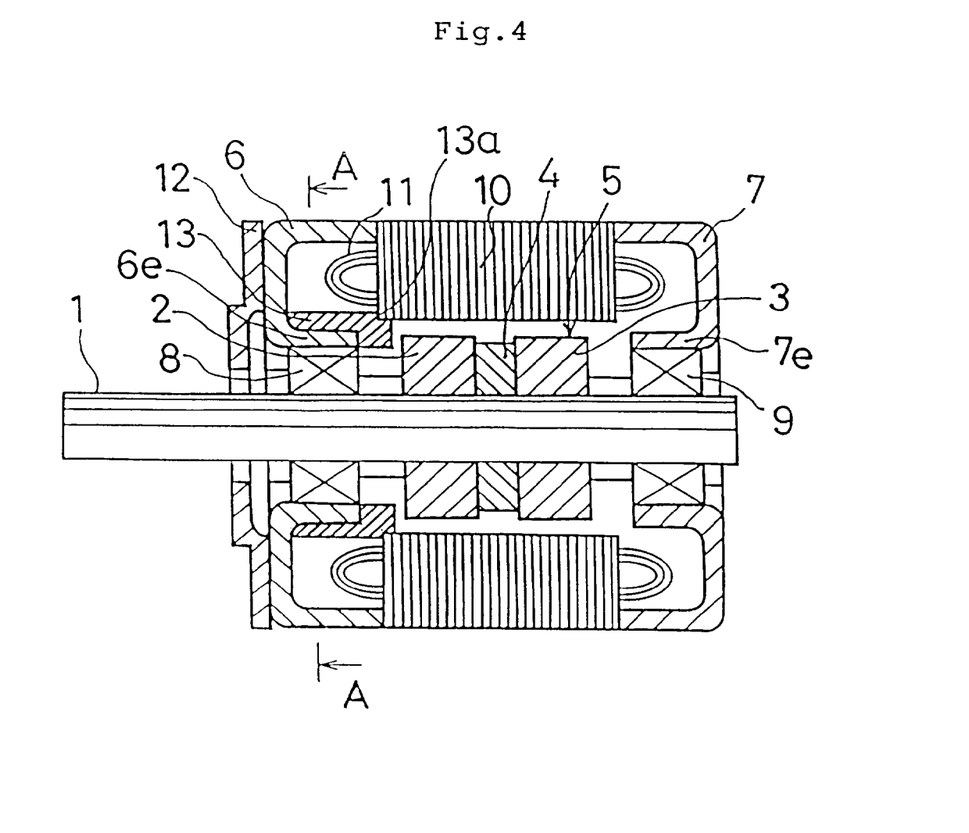
FIG. 4 is a longitudinal sectional view showing still another example of an embodiment of the present invention.
Figure 5:
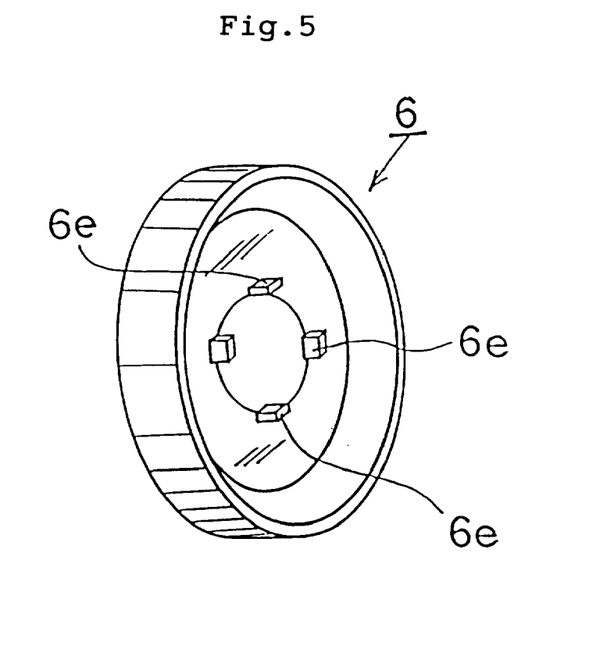
FIG. 5 is a perspective view showing projected pieces formed on a casing.
Figure 6:
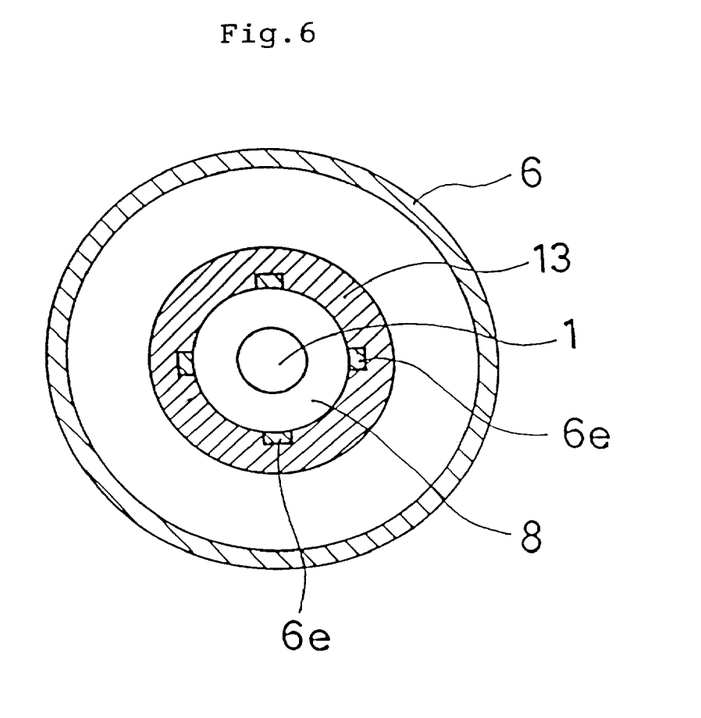
FIG. 6 is a cross-sectional view showing a part taken along the line A—A of FIG. 4.

In the embodiments shown in FIGS. 1 to 3, the bushes 13 are made separately from the casings 6 and 7. The bushes 13 may be formed of synthetic resin having thermoplasticity for being fixed to the casings 6 and 7. FIG. 4 is a longitudinal sectional view showing the above embodiment. FIG. 5 is a perspective view showing a casing 6 of the two casings 6 and 7. Incidentally, since the structure of the casing 7 is the same as that of the casing 6, a showing and an explanation thereof are omitted. In this embodiment, an inner end of the casing 6 is extended inwardly to form a plurality of projected piece 6e along the rotary shaft 1 (see FIG. 5). Synthetic resin is filled in between the projected piece 6e and the stator core 10 circumferentially to mold the bush 13 so as to fixed to the casing 6. Incidentally, in FIGS. 5 and 6, the number of the projected pieces 6e is four, but it is possible to increase the number of the projected pieces. In this case, it is possible to enhance a mechanical strength of the molded portion.

Figure 7:
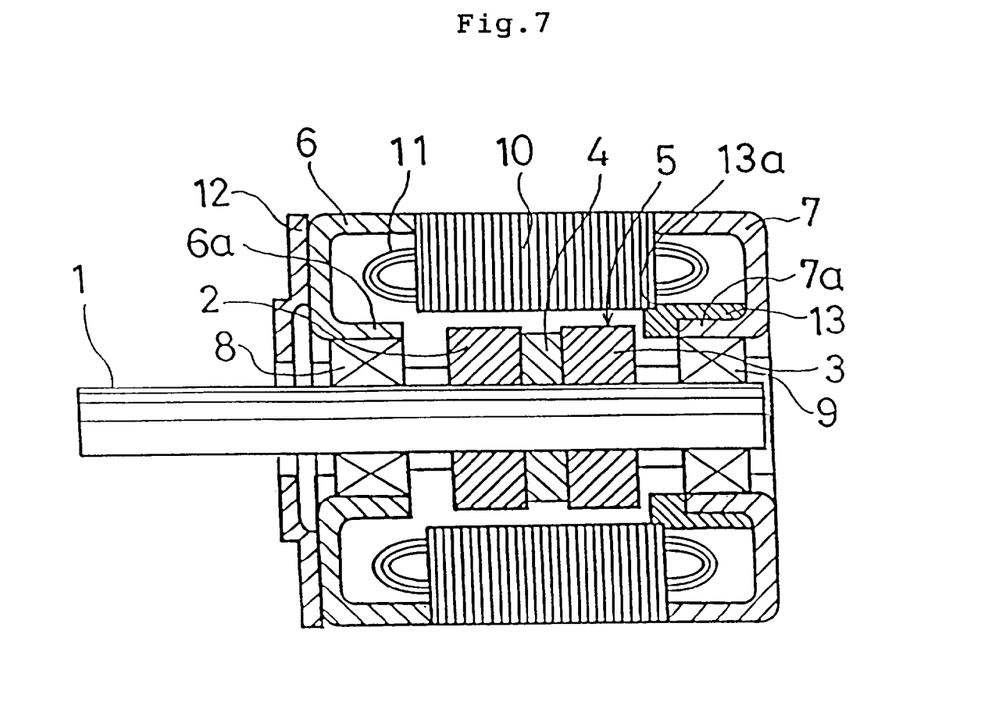
FIG. 7 is a longitudinal sectional view showing still another example of an embodiment of the present invention.
Figure 8:
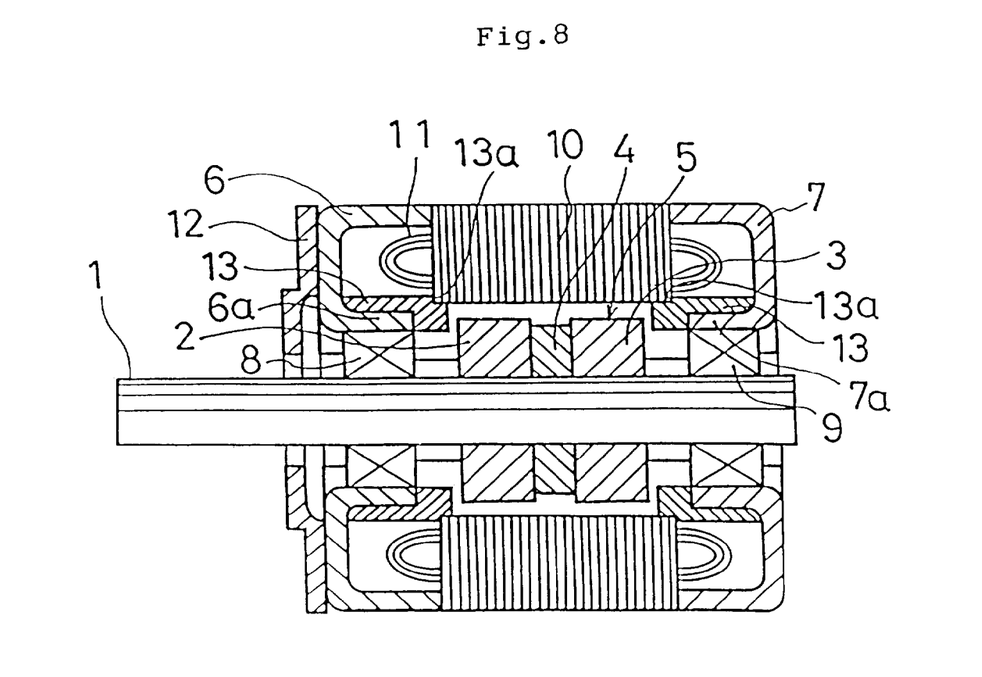
FIG. 8 is a longitudinal sectional view showing still another example of an embodiment of the present invention.

FIG. 7 shows an embodiment in which the structure which is the same as that shown in FIG. 4 is applied to the rear casing 7. Furthermore, FIG. 8 shows an embodiment in which the above structure is applied to both the front and rear casings 6 and 7. The structure shown in FIGS. 4 and 7 supports one end of the inner circumferential portion of the stator core 10, whereas the structure shown in FIG. 8 supports both ends of the inner circumferential portion of the stator core 10. In this case, any displacement due to vibration or the like may be avoided for a long period of time.

In the structures shown in FIGS. 4 to 8, since the casings 6 and 7 which are made of metal support both the bearings 8 and 9, the reliability of the mechanical engagement between the outer circumferential portions of the bearings 8 and 9 and the casings 6 and 7 may be enhanced. Then, since the bushes 13 are made of synthetic resin, there is an advantage that no undesirable magnetic circuit is generated.

Figure 9:
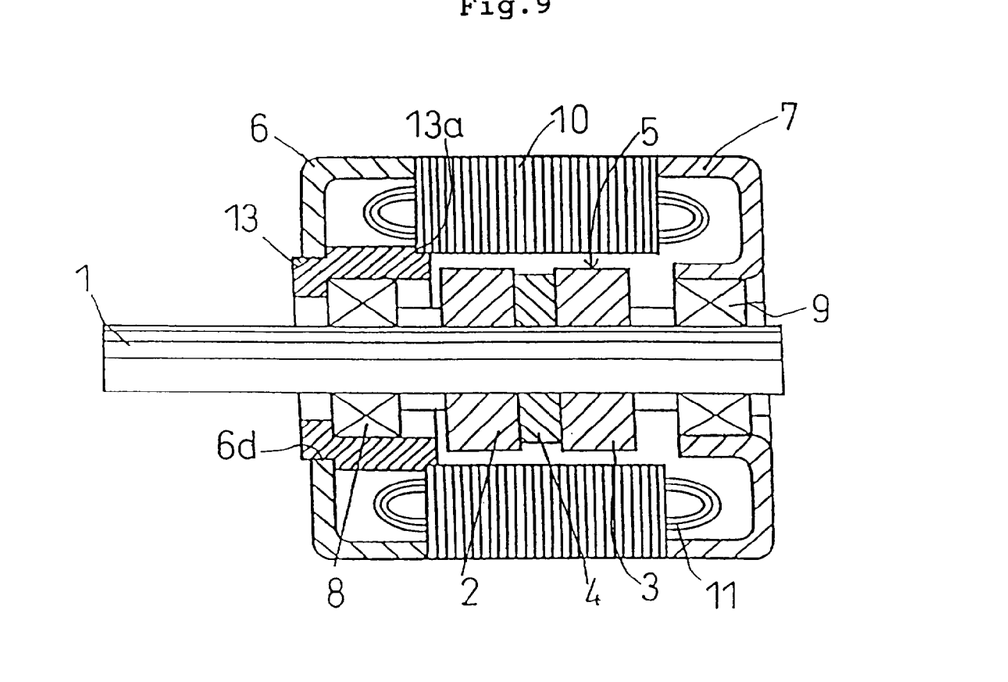
FIG. 9 is a longitudinal sectional view showing still another example of an embodiment of the present invention.
Figure 10:
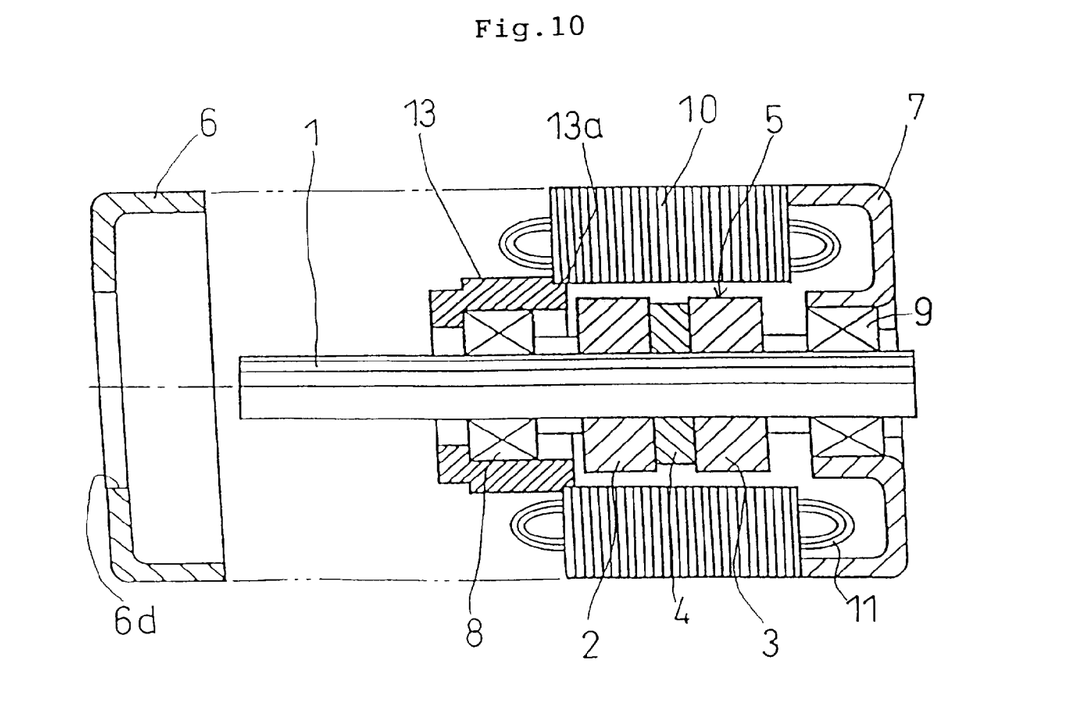
FIG. 10 is a longitudinal sectional view showing a condition in which the casing is assembled in FIG. 9.
Figure 11:
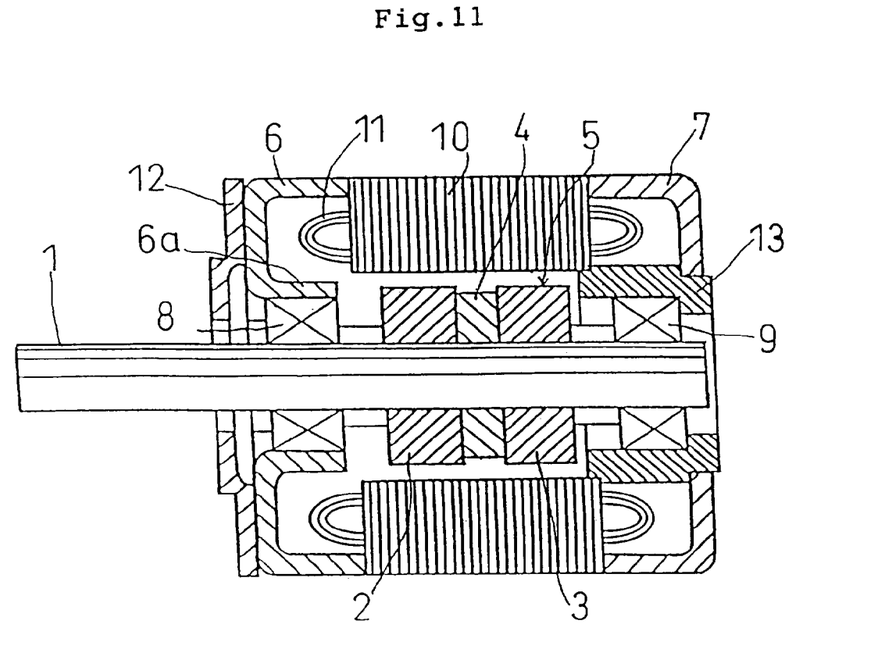
FIG. 11 is a longitudinal sectional view showing still another example of an embodiment of the present invention.

Also in the foregoing embodiments, the rotor 5 is intermittently rotated by intermittently feeding current to the stator coil 11 as shown in FIGS. 9 to 11. Since the inner circumferential portion of the stator core 10 is supported by the bush 13, the gap between the outer circumferential portion of the rotor 5 and the inner circumferential portion of the stator core 10 may be maintained correctly so that the performance of rotation may be kept at a high level.

In the foregoing embodiments, the bush 13 made of non-magnetic material is fixed to the casing 6. However, the present invention is not limited to this structure. According to the present invention, it is possible to fix the bush 13 to the stator core 10. FIG. 9 shows an embodiment in the above case. The bush 13 made of non-magnetic material is mounted on one side of the stator core 10 at the stepped portion 13a and fixed thereto to retain the bearing 8. After the bush 13 has been mounted, as shown in FIG. 10, the end portion of the bush 13 is fitted into a hole edge 6d of the casing 6 for completing the mounting work.

Figure 12:
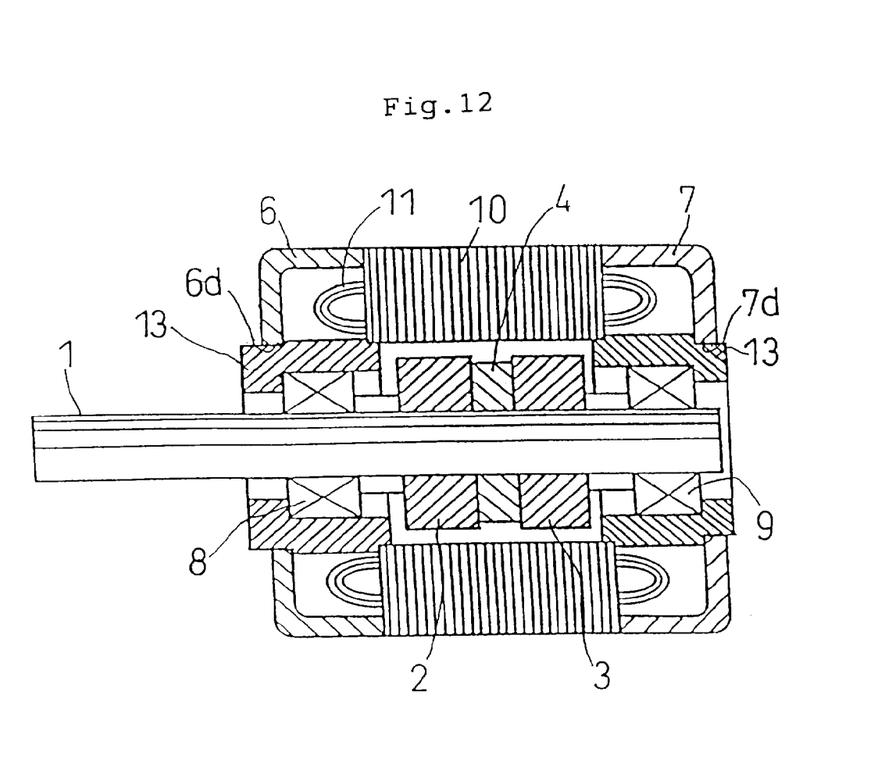
FIG. 12 is a longitudinal sectional view showing still another example of an embodiment of the present invention.

In FIG. 10, the bush 13 is mounted on the side of the bearing 8 of the stator core 10. The present invention is not limited to this arrangement. It is possible to mount on the side of the bearing 9 as shown in FIG. 11. Furthermore, it is possible to mount the bushes 13 on both sides of the stator core 10 as shown in FIG. 12. In the embodiment shown in FIG. 11, the bearing 9 is supported by the bush 13 and in the embodiment shown in FIG. 12, the bearings 8 and 9 are supported by the two bushes 13, respectively.

With respect to the material of the bushes 13 non-magnetic metallic material is desirable as mentioned above and as to the method to fix the bush 13 to the stator core 10, it may be fixed to the stator core 10 with adhesives or by press-fitting. Other than adhesives or press-fitting, the bushes 13 may be made of thermoplastic resin, thereby to be fixed to the stator core 10.

The casing may be formed by pressing a metal plate, molding a resin or die-casting in aluminum alloy. Also, with respect to the method of mounting the casing 6 on a sub-assembly in which the bush 13 is mounted on the stator core 10, the casing 6 is press-fitted into the bush 13 and fixed by screws or by press-fitting. In another method, it is possible to mount the casing 6 onto the bush 13 with adhesives or by welding. Furthermore, it is possible to weld and bond the casing 6 to the stator core 10.

According to the present invention, since the stepping motor is thus constructed according to any one of the first, second, sixth and seventh aspects of the invention, it is possible to make the casing with ease and at low cost by pressing. Since the bearing and the stator core or the casing are supported by the bush interposed into the casing or the stator core, the gap between the outer circumference of the rotor and the inner circumference of the stator core may be kept constant. Accordingly, it is possible to obtain a stepping motor having a stable performance. Then, since the bush is made of non-magnetic material, there is no fear that the magnetism generated by the stator core leaks to the casing made of the metal plate to thereby degrade the motor performance.

According to the third and eighth aspects of the present invention, since the bush is made of non-magnetic metal, it is considerably easy to mount the bush onto the casing or the stator core by press-fitting or the like. Also, according to the fourth, fifth and ninth aspects of the present invention, since the bush is made of synthetic resin having thermoplasticity, the manufacture thereof is easy to enhance the productivity.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A stepping motor having a structure in which a stator core is disposed outside of a rotor mounted on a rotary shaft, and a rear portion and a front portion of the rotary shaft are supported by bearings mounted on casings provided on the front and rear sides of the stator core, respectively, wherein the casings are press-formed with a metal plate, a bush made of non-magnetic material is fixed to on at least one of the casings, and the stator core is supported by the bush.

2. The stepping motor according to claim 1, wherein the bush supports at least one of the bearings.

3. The stepping motor according to claim 2, wherein the bush is made of non-magnetic metallic material, and fixed to at least one of the casings by one of adhesives and press-fitting.

4. The stepping motor according to claim 2, wherein a plurality of projected pieces directed inwardly for receiving an outer circumference of at least one of the bearings is formed integrally with a portion of at least one of the casings onto which at least one of the bearing is mounted, synthetic resin is filled in between the projected pieces and the stator core circumferentially so that the bush is mounted.

5. The stepping motor according to claim 2, wherein the bush is formed integrally with at least one of the casings with thermoplastic resin.

6. The stepping motor according to claim 1, wherein the bush is made of non-magnetic metallic material, and fixed to at least one of the casings by one of adhesives and press-fitting.

7. The stepping motor according to claim 1, wherein a plurality of projected pieces directed inwardly for receiving an outer circumference of at least one of the bearings is formed integrally with a portion of at least one of the casings onto which at least one of the bearing is mounted, synthetic resin is filled in between the projected pieces and the stator core circumferentially so that the bush is mounted.

8. The stepping motor according to claim 1, wherein the bush is formed integrally with at least one of the casings with thermoplastic resin.

9. A stepping motor having a structure in which a stator core is disposed outside of a rotor mounted on a rotary shaft, and a rear portion and a front portion of the rotary shaft are supported to bearings mounted on casings provided on the front and rear sides of the stator core, respectively, wherein a bush made of non-magnetic material is fixed to one of the stator cores, and at least one of the casings is supported by the bush.

10. The stepping motor according to claim 9, wherein the bush supports at least one of the bearings.

11. The stepping motor according to claim 10, wherein the bush is made of non-magnetic metal material, and fixed to at least one of the stator cores by one of adhesives and press-fitting.

12. The stepping motor according to claim 10, wherein the bush is made of thermoplastic resin and fixed to at least one of the stator cores.

13. The stepping motor according to claim 9, wherein the bush is made of non-magnetic metal material, and fixed to at least one of the stator cores by one of adhesives and press-fitting.

14. The stepping motor according to claim 9, wherein the bush is made of thermoplastic resin and fixed to at least one of the stator cores.

* * * * *